United States Patent [19]
Böhnke

[11] Patent Number: 6,160,791
[45] Date of Patent: Dec. 12, 2000

[54] TRANSMISSION SYSTEM FOR THE TRANSMISSION OF POWER CONTROL INFORMATION IN AN OFDM SYSTEM

[75] Inventor: Ralf Böhnke, Esslingen, Germany

[73] Assignee: Sony International (EUROPE) GmbH, Koln-Ossendorf, Germany

[21] Appl. No.: 09/141,735

[22] Filed: Aug. 27, 1998

[30] Foreign Application Priority Data

Aug. 29, 1997 [EP] European Pat. Off. ............. 97115027

[51] Int. Cl.[7] .................................................. H04J 11/00
[52] U.S. Cl. ........................................ 370/208; 370/210
[58] Field of Search ................................... 370/208, 203, 370/204, 206, 210, 211, 212, 213, 215, 329, 330, 332, 333, 341, 343, 252, 436, 437, 465, 480, 478; 375/272, 279, 283, 303, 308, 323, 327, 340, 344

[56] References Cited

U.S. PATENT DOCUMENTS

| | | | |
|---|---|---|---|
| 5,602,835 | 2/1997 | Seki et al. ............................... | 370/206 |
| 5,659,892 | 8/1997 | Soleimani et al. ...................... | 455/103 |
| 5,726,978 | 3/1998 | Frodigh et al. ......................... | 370/252 |
| 5,732,068 | 3/1998 | Takahashi et al. ...................... | 370/206 |
| 5,748,677 | 5/1998 | Kumar ..................................... | 375/285 |
| 5,761,190 | 6/1998 | Yamauchi et al. ...................... | 370/210 |
| 5,771,224 | 6/1998 | Seki et al. ............................... | 370/206 |
| 5,774,450 | 6/1998 | Harada et al. .......................... | 370/206 |
| 5,822,323 | 10/1998 | Kaneko et al. ......................... | 370/480 |
| 5,825,241 | 10/1998 | Beale et al. ............................. | 329/304 |
| 5,828,660 | 10/1998 | Baum et al. ............................ | 370/330 |
| 5,828,710 | 10/1998 | Beale ..................................... | 375/344 |
| 5,841,813 | 11/1998 | Van Nee ................................. | 375/279 |
| 5,946,292 | 8/1999 | Tsujishita et al. ...................... | 370/204 |
| 5,959,965 | 9/1999 | Ohkubo et al. ......................... | 370/203 |
| 5,970,047 | 10/1999 | Suzuki ................................... | 370/210 |

FOREIGN PATENT DOCUMENTS

| | | |
|---|---|---|
| 0 238 822 | 9/1987 | European Pat. Off. . |
| 0 562 868 | 9/1993 | European Pat. Off. . |
| 0 752 779 | 1/1997 | European Pat. Off. . |
| WO 97/01256 | 1/1997 | WIPO . |

OTHER PUBLICATIONS

Egami: "Improvement of K-band Satellite Link Transmission Capacity and Availability By The Transmitting Power Control", Electronics and Communications in Japan., vol. 66, No. 12, Dec. 1983, New York, US, pp. 80–89, XP002036838.

*Primary Examiner*—Dang Ton
*Assistant Examiner*—Phirin Sam
*Attorney, Agent, or Firm*—Frommer Lawrence & Haug, LLP.; William S. Frommer

[57] ABSTRACT

A transmission method for transmitting signals on the basis of an orthogonal frequency division multiplex (OFDM) system is disclosed. Information to be transmitted in the signals is modulated onto a number of subcarriers in the frequency domain according to an OFDM modulation method, the information including phase reference information and power control information. One of the subcarriers is a phase reference subcarrier that carries the phase reference information. The power control information is modulated onto the phase reference subcarrier, thereby improving transmission efficiency. The signals are transformed into the time domain, and then transmitted.

19 Claims, 3 Drawing Sheets

TRANSMISSION SYSTEM FOR THE TRANSMISSION OF POWER CONTROL INFORMATION IN AN OFDM SYSTEM

The present invention relates to a transmission method and a transmission apparatus for transmitting signals on the basis of an OFDM-system and a receiving method and a receiving apparatus for receiving OFDM-signals.

In a orthogonal frequency division multiplex (OFDM)-system, information to be transmitted in signals is modulated onto a number of subcarriers in a frequency domain. An OFDM-system is a multi-subcarrier system, in which the subcarriers are orthogonal to each other. The plurality of subcarriers in an OFDM-system can be allocated to a variable number of channels, each channel containing a variable number of subcarriers depending on information to be transmitted. The information to be transmitted by means of said subcarriers comprises normal data information and power control information. The power control information is used to control the transmission power of a bidirectional communication system. Thereby, the principle of the power control is to maintain a certain quality of transmission for the transmitted signals. The power control of a bidirectional communication system including for example a station A and a station B is explained in the following. If the station B receives signals from the station A, station B detects the quality of the received signals and asks the station A by transmitting a power control information to increase, keep or decrease the transmission power of the station A. The station A receives therefore the power control demand from the station B and adjusts its transmission power correspondingly. If the station A receives signals from the station B, the station A detects the quality of the received signals and asks the station B by transmitting a power control information to increase, keep or decrease the transmission power of the station B. The station B therefore receives the power control demand from the station A and adjusts its transmission power correspondingly. So each of the stations controls the transmission power of the other station. This scheme is called "closed-loop" power control. One of said subcarriers, for example the first subcarrier in a respective number of subcarriers (for example in a certain frequency channel) carries a phase reference information, if the information is differential phase modulated. The phase reference information is used in the receiving apparatus for differential phase demodulation of the information.

Figure 1:
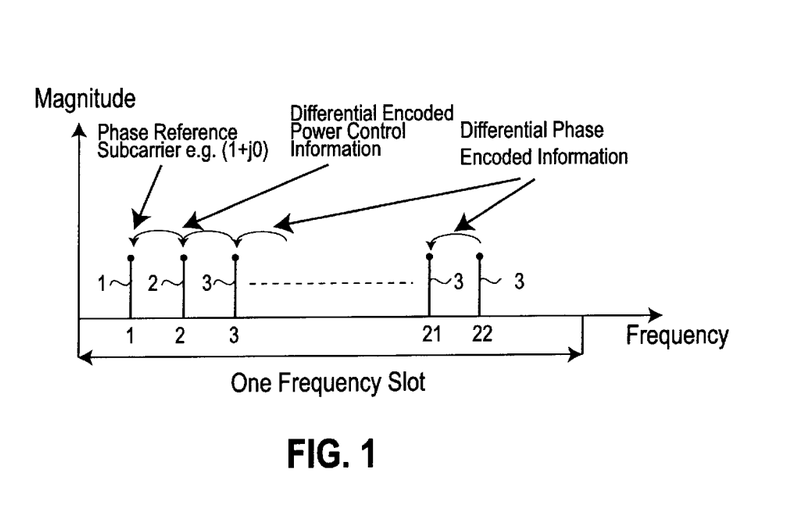
FIG. 1 shows a number of subcarriers in one frequency slot of a known OFDM-system carrying phase reference information and power control information.

Such a usual OFDM-system is explained relating to FIG. 1. FIG. 1 shows a number of subcarriers 1, 2, 3 in the frequency domain. One frequency slot or one frequency channel contains a certain number of subcarriers. In the example shown in FIG. 1, one frequency slot contains 22 subcarriers. The first subcarrier shown in said frequency slot is a phase reference subcarrier 1 carrying a phase reference information, e. g. (1+j×0) in the complex domain. The second subcarrier 2 carries a differential encoded power control information. The power control information is contained in the differential encoding of the second subcarrier 2 and the phase reference subcarrier 1, as shown in FIG. 1. The succeeding 20 subcarriers 3 of the shown frequency slot carry differential phase encoded information, e. g. DQPSK-information (differential quadrature phase shift keying information).

As illustrated in FIG. 1, the differential encoding is performed between adjacent subcarriers. The first subcarrier is solely used for phase reference, and the second subcarrier 2 contains a power control information. The power control information, can for example be an "UP", "DOWN" or "KEEP" information, which is detected and used by a receiving apparatus to control the transmission power in a corresponding transmission apparatus, whereby the receiving apparatus and the corresponding transmission apparatus can be comprised in one transmission and receiving apparatus.

A transmission apparatus for transmitting signals on the basis of an OFDM-system generally comprises modulation means for modulating information to be transmitted in said signals onto a number of subcarriers in the frequency domain according to an OFDM-modulation method, said information including a power control information generated in a power control information means, whereby one of said subcarriers carries a phase reference information, transformation means for transforming said modulated signals into the time domain and transmission means for transmitting said transformed signals. A corresponding receiving apparatus for receiving signals transmitted, for example, by such a transmission apparatus comprises receiving means for receiving said signals, transformation means for transforming said signals into the frequency domain and detection means for detecting the power control information. The phase reference information is used in such a receiving apparatus for decoding differential phase-encoded data information.

The disadvantage in such a known OFDM-system is, that two subcarriers are necessary to transmit the phase reference information and the power control information. Another disadvantageous aspect is that a separated modulation and demodulation, respectively, of the phase reference information and the power control information is necessary.

The object of the present invention is therefore to provide a transmission method and a transmission apparatus for transmitting signals on the basis of an OFDM-system and a receiving method and a receiving apparatus for receiving signals on the basis of an OFDM-system which allow a more efficient transmission and reception of OFDM-signals comprising phase reference information and power control information.

The transmission method for transmitting signals on the basis of an OFDM-system according to an aspect of the invention comprises the steps of modulating information to be transmitted in said signals onto a number of subcarriers in a frequency domain according to an OFDM-modulation method, said information including a power control information, wherein one of said subcarriers carries a phase reference information, transforming said signals into the time domain, and transmitting said transformed signals, characterized in that in said modulating step said power control information is modulated onto said phase reference subcarrier carrying said phase reference information.

The transmission apparatus for transmitting signals on the basis of an OFDM-system comprises modulation means for modulating information to be transmitted in said signals onto a number of subcarriers in the frequency domain according to an OFDM-modulation method, said information including a power control information generated in a power control information generation means, whereby one of said subcarriers carries a phase reference information, transformation means for transforming said modulated signals into the time domain, and transmission means for transmitting said transformed signals, characterized in, that in said modulation means said power control information is modulated onto said phase reference subcarrier carrying said phase reference information.

According to the present invention, the phase reference subcarrier carries also the power control information to be transmitted. Therefore, only one subcarrier in a number of subcarriers, e. g. within a frequency slot or within a frequency channel, carries said phase reference information and said power control information. As a result, the system according to the present invention is more effective than known OFDM-systems transmitting phase reference information and power control information.

Advantageously, in said modulation means the magnitude of said phase reference carrier carrying said phase reference information is modulated to represent a power control information to be transmitted. In this case, the phase of the phase reference carrier represents the phase reference information and the magnitude of the phase reference carrier represents the power control information. Usually, the first subcarrier in one frequency slot or one frequency channel is the phase reference subcarrier. The phase reference information is usually used for a differential demodulation of the information carried by the succeeding subcarriers, if said information is differentially encoded, e. g. by DQPSK.

Advantageously, said modulation means provides said phase reference subcarrier with a different magnitude and thus a different power level for each of the various possible power control information to be transmitted. Thereby, a mean power level of the sum of the different possible power levels of said phase reference subcarrier can be equal to a mean power value of the rest of said number of subcarriers. The power control information to be transmitted can, for example, represent an "UP"-power control information, a "DOWN" power control information or a "KEEP" power control information. The "UP" power control information detected in a corresponding receiving apparatus is used to increase the transmission power in the corresponding transmission apparatus, the "DOWN" power control information detected in the receiving apparatus is used to decrease the transmission power in the corresponding transmission apparatus and the "KEEP" power control information detected in the receiving apparatus is used to keep the same transmission power in the transmission apparatus. Each of the different power control information is represented by a different magnitude and thus a different power level of the phase reference subcarrier. In the above example with three different power control information, a ternary level digital magnitude modulation is used in the subcarrier domain of the OFDM-system to transmit the respective power control information. In this case, the "KEEP" power control information is represented by a magnitude of said phase reference subcarrier, which lies between the magnitudes of said phase reference subcarrier for said "UP" power control information and said "DOWN" power control information, respectively. Therefore, if a transmission error occurs (e. g. additional noise on the subcarrier containing the power control information), the effect of a wrongly detected power control information is limited.

It is further advantageous that the mean power value of the sum of the different possible power levels of said phase reference subcarrier are equal to the mean power value of the rest of said number of subcarriers. In this way, the magnitude of the phase reference subcarrier can be varied dependent on the confidence level required in the receiving apparatus. If a high confidence level is required, the variation of the magnitudes of the phase reference subcarrier for the different power control information can be more important, whereas, if a lower confidence level is required, the variation of the magnitudes of the phase reference subcarriers for the different power control information can be smaller.

With the transmission method and the transmission apparatus according to the present invention, the efficiency of an OFDM-transmission scheme is improved and the overhead in a respective number of subcarriers is reduced to one subcarrier.

In another aspect of the invention, there is provided a receiving method for receiving signals on the basis of an OFDM-system according to the present invention is claimed, wherein information transmitted in said signals is modulated onto a number of subcarriers in the frequency domain according to an OFDM-modulation method, said information including a power control information in one of said subcarriers carrying a phase reference information, comprising the steps of receiving said signals, transforming said signals into the frequency domain, and detecting said power control information, characterized in, that the magnitude and thus the power level of said phase reference subcarrier carrying said phase reference information is modulated to represent said power control information, whereby in said step of detecting said power control information said power level of said phase reference subcarrier is detected.

In a further aspect of the invention, there is provided a receiving apparatus for receiving signals on the basis of an OFDM-system wherein information transmitted in said signals is modulated onto a number of subcarriers in the frequency domain according to an OFDM-modulation method, said information including a power control information and one of said subcarriers carrying a phase reference information, comprising receiving means for receiving said signals, transformation means for transforming said signals into the frequency domain, and detection means for detecting said power control information, characterized in, that the magnitude and thus the power level of said phase reference subcarrier carrying said phase reference information is modulated to represent said power control information, whereby in said detection means said power level of said phase reference subcarrier is detected.

The receiving apparatus and the receiving method according to the present invention are therefore adapted to receive signals transmitted by a transmission apparatus and using a transmission method according to the present invention.

Advantageously, in said receiving apparatus according to the present invention, said phase reference subcarrier is provided with a different magnitude and thus a different power level for each of the various possible transmitted power control information, and the respective power level of said phase reference subcarrier is detected by means of decision levels generated by a decision level generation means to provide said power control information. Thereby, in said decision level generation means, said decision levels can be varied dependent on required confidence levels.

Advantageously, in said detection means a mean power value of the sum of at least some of the rest of said number of subcarriers is calculated and compared with said detected power level of said phase reference subcarrier to provide said power control information. Thereby, the number of subcarriers, for which said mean power value is calculated and compared with said detected power level of said phase reference subcarrier, is varied dependent on the transmission properties. If, for example, the receiving apparatus receives signals in a fast fading environment (car, train), it is advantageous to calculate, in said detection means, the mean power value of the sum of all other subcarriers in said number of subcarriers except the phase reference subcarrier, and to compare this mean power value with the detected power level of said phase reference subcarrier. In a slow fading environment pedestrian), it is sufficient to calculate the mean power value of the sum of only some of said other subcarriers and to compare said mean power value with said detected power level of said phase reference subcarrier.

The present invention is explained in detail by means of preferred embodiments relating to the enclosed drawings, in which.

Figure 2:
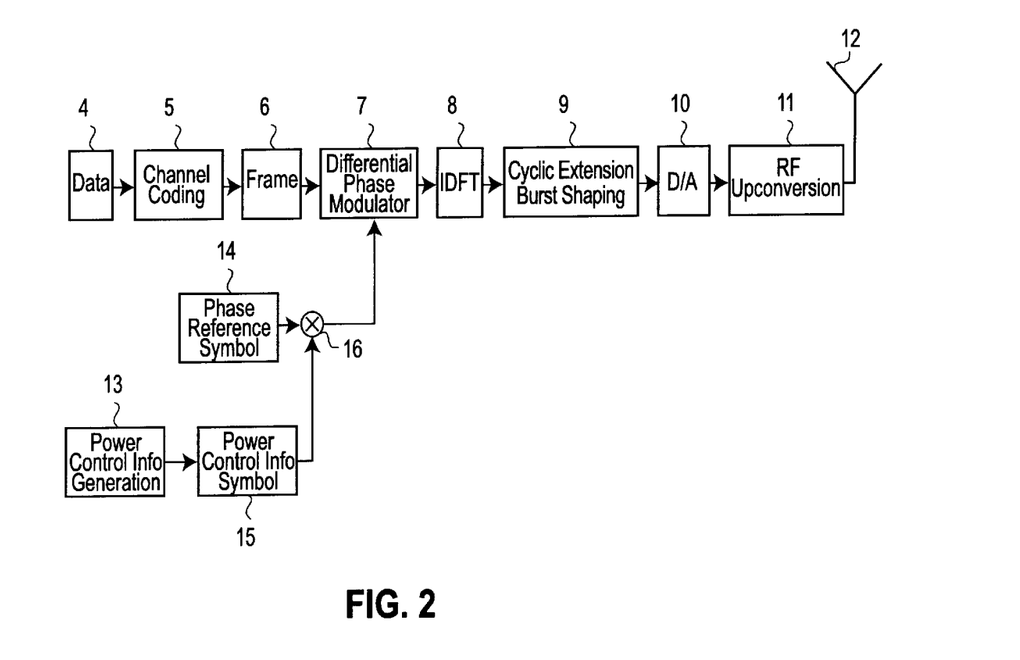
FIG. 2 shows a general structure of a transmission apparatus according to the present invention.

FIG. 2 shows the general structure of a transmission apparatus according to the present invention. Data 4 to be transmitted are channel-coded in a channel-coding means 5. The channel-coded data are fed into a frame generation means 6. In the frame generation means 6, a data frame is generated, which corresponds to the window size used in the Fourier transformation means 8. If for example the OFDM-system uses 22 subcarriers, a 32 point discrete Fourier transformation can be used to generate time domain symbols. This means, that in the frame generation means 6, 32 data symbols are generated in which the 22 useful symbols from the 22 subcarriers are comprised. A differential phase modulation means modulates the signals from the frame generation means 6. The modulated signals are then transformed into the time domain in a discrete Fourier transformation means 8, e. g. a fast Fourier transformation means. The transformed signals are provided with a guard band and a cyclic extension for synchronization reasons in a burst shaping means 9 and then digital to analog converted in a D/A-converter 10. After an RF-upconversion of the converted signals in a RF-upconversion means 11, the signals are transmitted by an antenna 12. Although the shown transmission apparatus is a wireless transmission apparatus, the present invention can also be used in a wired transmission system.

A power control information generation means 13 generates power control information. Thereby, the selection of the power control information to be generated can depend for example on transmission properties like the quality of received signals or other characteristics of the transmission system. Although a large number of possible power control information can be generated in the power control information generation means 13, the transmission system according to the present invention is explained relating to three different possible power control information. These three different possible power control information are an "UP" power control information, a "DOWN" power control information and a "KEEP" power control information. The "UP" information is used to increase the transmission power in a corresponding transmission apparatus, the "DOWN" information is used to decrease the transmission power in the transmission apparatus and the "KEEP" information is used to hold the actual transmission power in the transmission apparatus.

The respective power control information generated in the power control information generation means 13 is supplied to a generation means for generating a respective power control information symbol. Also, a generation means 14 for generating a respective phase reference symbol is provided. The phase reference symbol generated by the generation means 14 and the power control information symbol generated by the generation means 15 are multiplied in a multiplier 16 and supplied to the differential phase modulation means 7. In the modulation means 7, a first subcarrier of a number of subcarriers is modulated with the output of the multiplier 16 to carry a phase reference information and the power control information generated by the generation means 14 and the generation means 15, respectively.

The general form of the phase reference symbol is $S_{PR}=1,0*E^{j\psi}$. The magnitude of this phase reference symbol $S_{PR}=1,0$. If, for example, the reference phase $\psi$ is selected to be $0,5\ \Pi$, the phase reference symbol in this case is $(0,0+j\times1,0)$.

The general form of the power control information symbol generated by the generation means 15 is $S_{PC}=A(1+j\times0)$, wherein A is the magnitude of the power control information symbol $S_{PC}$. If three different power control information ("UP", "KEEP", "DOWN") are available and can be generated by the power control information generation means 13, the corresponding power control information symbols are $S_{PK}=A_K\times(1+j\times0)$, $S_{PD}=A_D\times(1+j\times0)$, and $S_{PU}=A_U\times(1+j\times0)$. $S_{PK}$ is the power control information symbol and $A_K$ is the magnitude for the "KEEP" information. $S_{PD}$ is the power control information symbol, and $A_D$ is the magnitude for the "DOWN" information. $S_{PU}$ is the power control information symbol, and $A_U$ is the magnitude for the "UP" information. The magnitudes $A_K$, $A_U$ and $A_D$ are real values. It is important that all three power control information symbols have the same phase in the complex domain, and it is preferred that the phase is 0, as defined above $(1+j\times0)$.

In the multiplier 16, the phase reference symbol $S_{PR}$ and the respective power control information symbol are multiplied, so that the output of the multiplier is $S_{PR}*S_{PK}$, $S_{PR}*S_{PD}$, or $S_{PR}*S_{PU}$. It is to be noted, that the power control symbol does not influence the phase of the phase reference symbol if the power control symbol has a phase 0. If the phase of the power control information has a phase different from 0, the phase reference of the combined symbol is turned in the complex domain by the same angle for all three different power control information.

Therefore, the phase of the first subcarrier of a number of subcarriers is modulated in the modulation means 7 to represent the phase reference information, and the magnitude of the same first subcarrier is modulated in said modulation means 7 to represent the respective power control information to be transmitted.

Figure 3:
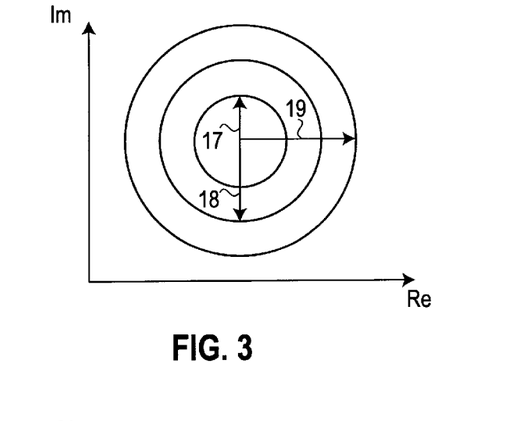
FIG. 3 shows a complex domain diagram of different phase reference subcarriers carrying different power control information.

In FIG. 3, three different examples for combined phase reference and power information symbols are shown. The symbol 17 represents a phase reference subcarrier modulated with a power control information "DOWN". The phase reference symbol $S_{PR}$ is set to $S_{PR}=(0+j\times1)$. The power control information symbol $S_{PC}$ is set to $S_{PC}=A_D\times(1+j\times0)$. Therefore, the combined symbol 17 is $S_{PR}*S_{PC}=A_D*(0+j\times1)$. The combined symbol 18 represents another phase reference subcarrier containing a power control information "KEEP". The phase reference $S_{PR}$ is set to $S_{PR}=(0-j\times 1)$. The power control information symbol $S_{PC}$ is set to $S_{PC}=A_K*(1+j\times 0)$. Therefore, the combined symbol 18 is $S_{PR}*S_{PC}=A_K*(0-j\times 1)$. The combined symbol 19 represents a phase reference subcarrier carrying a power control information "UP". The phase reference symbol $S_{PR}$ is set to $S_{PR}=(1+j\times 0)$. The power control information symbol $S_{PC}$ is set to $S_{PC}=A_U*(1+j\times 0)$. Therefore, the combined symbol 19 is $S_{PR}*S_{PC}=A_U*(1+j\times 0)$.

The scheme shown in FIG. 3 is not limited to specific magnitudes for $A_K$, $A_U$ and $A_D$. However, the mean power value of the sum of the three possible power levels of the phase reference subcarrier is chosen to be equal to a mean power value of the other subcarriers. If, for example, a number N of subcarriers is to be transmitted in one frequency slot or one frequency channel, the first subcarrier is chosen to be the phase reference subcarrier containing also the power control information. The rest of said number N of subcarriers, i. e. N−1 subcarriers, transmit differential encoded data information. The magnitude and thus the power level of the N−1 subcarriers are equal, if the subcarriers are differential phase encoded.

A first example of a selection of the magnitudes $A_U$ of the "UP" information, $A_K$ of the "KEEP" information, and $A_D$ of the "DOWN" information is $A_U=1,155$, $A_K=1,0$ and $A_D=0,816$. The magnitude is the square root of the total power of the phase reference subcarrier, so that the total power for the "UP" information is 4/3, for the "KEEP" information is 1,0, and the "DOWN" information is 2/3. Therefore, the mean power value of the sum of the three possible power control information to be transmitted is $(1/3)\times(4/3+2/3+1)=1,0$. 1,0 is also the mean power of the other N−1 subcarriers.

A second example for the magnitudes of the three different power control information is $A_U=1,225$, $A_K=1,0$, and $A_D=0,707$. In this case, the total power of the "UP" information is 1,5, of the "KEEP" information is 1,0, and of the "DOWN" information is 0,5. The mean power value of the sum of the three different possible power control information is $(1/3)\times(1,5+0,5+1,0)=1,0$.

The first and the second example have different advantages and drawbacks. The first example has a smaller variation of the magnitude of the phase reference subcarrier. The second example has a larger decision margin and therefore increases the confidence of the power control decision on the side of the receiving apparatus. It has to be noted, that the magnitude and the power level for the "KEEP" information is between the magnitude and the power, respectively of the "UP" information and the "DOWN" information. This measure increases the confidence level, since with large transmission errors the "KEEP" information is maintained.

Figure 4:
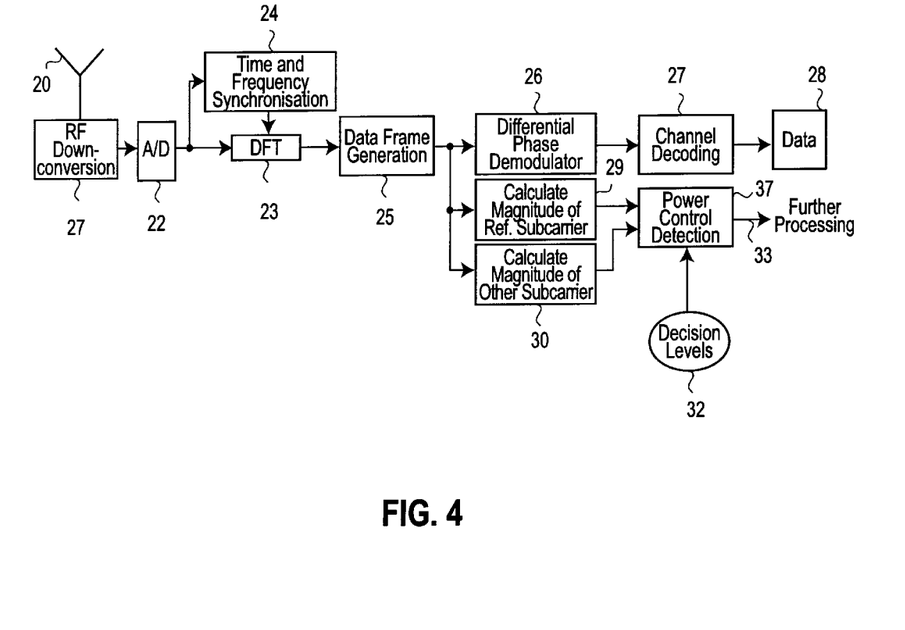
FIG. 4 shows the general structure of a receiving apparatus according to the present invention.

In FIG. 4, the general structure of a receiving apparatus according to the present invention is shown. An antenna 20 receives signals on the basis of an OFDM-system. The information transmitted in such signals is modulated onto a number of subcarriers in a frequency domain according to an OFDM-modulation method, e. g. by a transmission apparatus as shown in FIG. 1. In the following, the receiving apparatus shown in FIG. 4 is explained for the reception of ternary modulated signals as shown in FIG. 3. The receiving apparatus according to the present invention, however, can be used for the reception of any signals on the basis of an OFDM-system, in which information is modulated onto a number of subcarriers, wherein a phase reference subcarrier also carries a power control information. The transmission apparatus shown in FIG. 2 and the receiving apparatus shown in FIG. 4 can be comprised in one common transmission and receiving apparatus.

The signals received in the antenna 20 are RF-downconverted in a RF-downconversion means 21. The downconverted signals are then analog-to-digital-converted in an A/D-converter 22. The converted signals are then transformed into the frequency domain by a discrete Fourier transformation means 23, e. g. by a fast Fourier transformation means. For the synchronization of the transformation, a time/frequency synchronization means 24 is provided. The signals transformed into the frequency domain are fed into a data frame generation means 25. In the data frame generation means, the useful data symbols are separated or selected from the transformed signals. If for example the transmission system uses 22 subcarriers, a 32 point discrete Fourier transformation can be carried out in the Fourier transformation means 23. This means that 32 data symbols are generated but only 22 of these 32 data symbols are useful. These 22 useful data symbols are therefore separated or selected in the data frame generation means 25 and then demodulated in a demodulation means 26. Since the information transmitted in said signals is differential phase modulated onto said subcarriers, the demodulation means 26 is a differential phase demodulation means. The demodulated signals are then channel-decoded in a channel-decoding means 27 to provide data 28 to be further processed.

In the demodulation means 26, the phase of the phase reference subcarrier is detected to carry out the differential phase demodulation of the succeeding subcarriers. In a number of subcarriers contained in a frequency slot or a frequency channel, for example the first subcarrier is the phase reference subcarrier. Further on, a power control detection is carried out on the output of the data frame generation means 25. The output of the data frame generation means 25 is supplied to a calculation means 29 for the calculation of the power level of the phase reference subcarrier and at the same time to a calculation means 30 for the calculation of the power level of the other subcarriers in the respective number of subcarriers. The calculation means 29 and the calculation means 30 are thus arranged in parallel, and their respective outputs are supplied to a power control detection means 31. In the receiving apparatus shown in FIG. 4, there is also provided a decision level generation means 32, which generates decision levels to control the power control detection on behalf of required confidence levels.

If a frequency channel or a frequency slot contains a number N of subcarriers, in which the first subcarrier is the phase reference subcarrier, the power level of the first subcarrier is calculated in the calculation means 29. In the calculation means 30, a mean power value is calculated for the sum of at least some of the other N−1 subcarriers. Thereby, the number of subcarriers which are used for the calculation of a mean power value is varied dependent on transmission properties. In fast fading environments, e. g. if the receiving apparatus is used in a fast driving car or train, a mean power value of all N−1 subcarriers is calculated. If the receiving apparatus is used in a slow fading environment, e. g. by a pedestrian, the mean power value of only some of the N−1 other subcarriers need to be calculated.

In the power control detection means 31, the power level of the phase reference subcarrier calculated in the calculation means 29 and the mean power value calculated in the calculation means 30 are compared. Then, by means of decision levels generated in the decision level means 32, the power control detection means 31 outputs the corresponding power control information at an output 33 for further processing. In the example explained above relating to FIGS. 2 and 3, the power control detection means 31 outputs an "UP" information, a "DOWN" information or a "KEEP" information.

Figure 5:
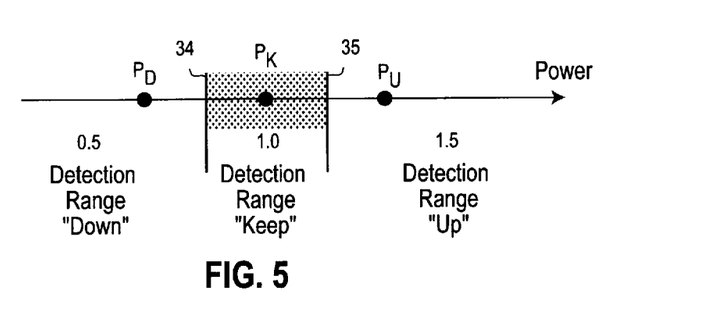
FIG. 5 shows a first example of the selection of three different power levels with decision levels according to a first confidence option.

In FIGS. 5, 6, 7, and 8, some examples for different power levels and decision levels are shown. In FIG. 5, a first example of power levels $P_D$, $P_K$ and $P^U$ and decision levels 34, 35 according to the first confidence option are shown. The power level $P_D$ is the power level of a "DOWN" information, the power level $P_K$ is the power level of a "KEEP" information and the power level $P_U$ is the power level of an "UP" information, transmitted respectively by a transmission apparatus. The same is true also for the FIGS. 6, 7, and 8. Due to noise or other transmission problems, the power levels $P_D$, $P_K$, and $P_U$ are usually not received ideally. Therefore, in the receiving apparatus some decision levels are set to ensure a correct detection of possibly disturbed power control information.

Figure 6:
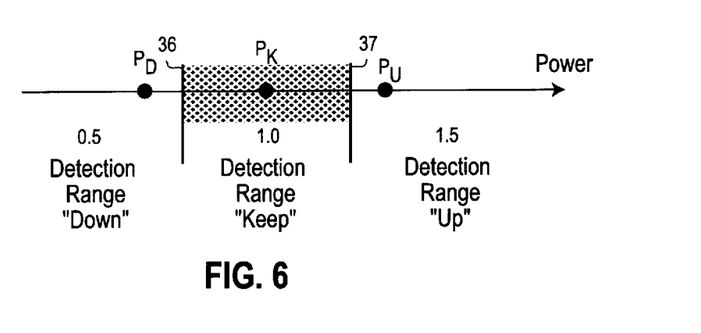
FIG. 6 shows the first example of a selection of three different power levels with decision levels according to a second confidence option.

In FIGS. 5 and 6, the power level $P_D$ is set to $P_D$=0,666, the power level $P_K$ is set to $P_K$=1,0 and the power level $P_U$ is set to $P_U$=1,333. In the example shown in FIG. 5, the decision levels 34 and 35 split the decision range between the power levels $P_D$ and $P_K$ and between $P_K$ and $P_U$, respectively, in two equal parts. In other words, the decision level 34 is in the middle of the power level $P_D$ and the power level $P_K$, and the decision level 35 is in the middle of the power level $P_K$ and the power level $P_U$. In a case, in which the calculated power value of the received phase reference subcarrier is between the decision levels 34 and 35, a "KEEP" information is output by the power control detection means 31. Thereby, in the examples shown in FIGS. 5, 6, 7 and 8, the mean power value of the sum of the other subcarriers calculated in the calculation means 30 is set to 1,0. If the power level of the received phase reference subcarrier is larger than the decision level 35, an "UP" information is output, and if the power level of the received phase reference subcarrier is smaller than the decision level 34, a "DOWN" information is output. In cases, in which the mean power value of the sum of the other subcarriers is not 1,0, the power control information to be output by the power control detection means 31 is determined as follows: If $P_R$<0,833×$P_M$, wherein $P_R$ is the power level of the received phase reference subcarrier calculated in the calculation means 29, and $P_M$ is the mean power value of the sum of the other received subcarriers calculated in the calculation means 30, the "DOWN" information is output. If 0,833× $P_M$≦$P_R$≦1,166×$P_M$, a "KEEP" information is output. If $P_R$>1,166×$P_M$, a "UP" information is output. FIG. 5 and also FIGS. 6, 7, and 8 show cases in which the mean power value of the sum of the other received subcarriers is set to 1,0($P_M$=1,0).

In FIG. 6, the power levels $P_D$, $P_K$ and $P_U$ correspond to the respective power values in FIG. 5. However, in the case shown in FIG. 6, decision levels 36 and 37 are different from the decision levels 34 and 35 of the case shown in FIG. 5. In the case shown in FIG. 6, decision levels 36 and 37 are closer to the power levels $P_D$ and $P_U$, respectively. More particular, the decision level 36 splits the distance between the power level $P_D$ and the power level $P_K$ into ⅓ and ⅔. Also, the decision level 37 splits the distance between the power level $P_K$ and the power level $P_U$ into ⅔ and ⅓. Therefore, the detection range between the decision levels 36 and 37 is larger compared to the detection range between the decision levels 34 and 35 of FIG. 5. The choice of the decision levels 36 and 37 results in a higher security for the detection of a "KEEP" information. In ambiguity cases, the decision "KEEP" is made by the power control detection means 31. Therefore, the decision levels 36 and 37 shown in FIG. 6 have a higher confidence level than the decision levels 34 and 35 shown in FIG. 5. More particular, in the case of FIG. 6, a "DOWN" information is output if $P_R$<0, 777×Pm. A "KEEP" information is output, if 0,777× Pm≦$P_R$≦1,222×Pm. An "UP" information is output if $P_R$>1,222×Pm.

Figure 7:
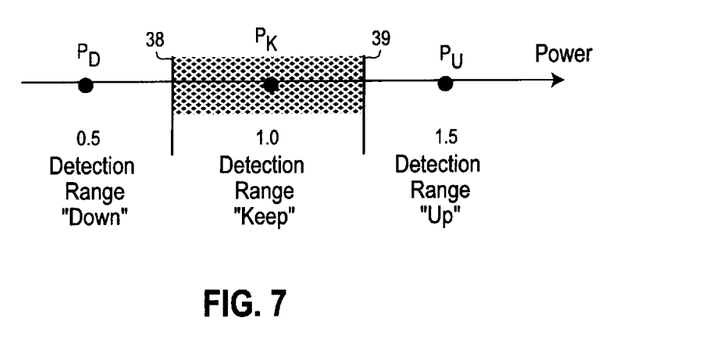
FIG. 7 shows a second example of a selection of three different power levels with decision levels according to a first confidence option.
Figure 8:
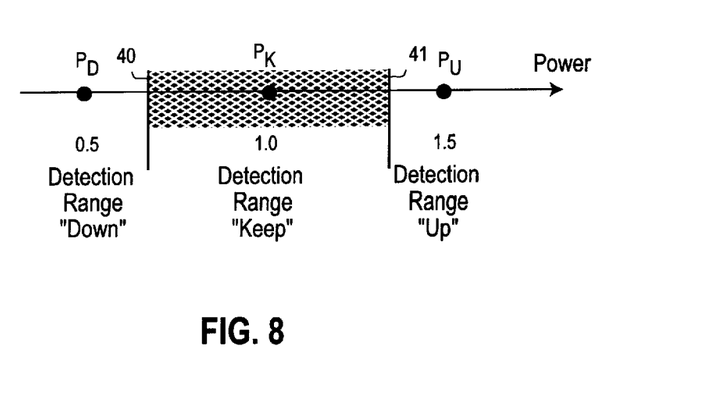
FIG. 8 shows the second example of a selection of three different power levels with decision levels according to a second confidence option.

FIGS. 7 and 8 show a second example of power levels $P_D$, $P_K$ and $P_U$. In the example shown in FIGS. 7 and 8, $P_D$ is set to 0,5, $P_K$ is set to 1,0 and $P_U$ is set to 1,5. The confidence level of the case shown in FIG. 7 corresponds to the confidence level of the case shown in FIG. 5, and the confidence level of the case shown in FIG. 8 corresponds to the confidence level shown in FIG. 6.

In the case of FIG. 7, the decision levels 38 and 39 are located in the middle between the power level $P_D$ and the power value $P_K$, and in the middle between the power level $P_K$ and the power level $P_U$, respectively. FIG. 7 shows the case for the mean power value Pm calculated in the calculation means 30 being 1,0. If Pm is different from 1,0, the detection of the received power control information is made as follows. If $P_R$<0.75×Pm, a "DOWN" information is output by the power control detection means 31. If 0.75× Pm≦$P_R$≦1.25×Pm, a "KEEP" information is output. If $P_R$>1.25Pm, an "UP" information is output.

In the case shown in FIG. 8, the position of decision levels 40 and 41 corresponds to the position of the decision levels 36 and 37 of the case shown in FIG. 6. In the case shown in FIG. 8, a "DOWN" information is output, if $P_R$<0.666×Pm. A "KEEP" information is output if 0.66× Pm≦$P_R$≦1.333×Pm. An "UP" information is output if $P_R$>1.333×Pm. The confidence level of the case shown in FIG. 8 corresponds to the confidence level of the case shown in FIG. 6. For slow fading channels (flat channels), the confidence level corresponding to the cases shown in FIGS. 5 and 7 is preferred. In a slow fading channel scenario, each subcarrier suffers from almost the same magnitude and power degradation. The mean power values of the information subcarriers with almost an equal magnitude results in a high confidence of the detection and decision of the power control information on the basis of the ratio of the calculated power level of the phase reference subcarrier compared to the mean power value of the sum of the other subcarriers (information subcarriers) and the respective decision levels. In such a case, the transmission of the power control information can be achieved with a low error rate, so that the relative detection range between the respectively chosen decision levels does not need to be very large. The opposite is true for fast fading channels. In a fast fading environment, a slightly decreased performance due to large variations in the channel caused by deep fading dips is expected. If the phase reference subcarrier carrying the power control information is transmitted in one of these dips, the relationship between the mean power value of the other subcarriers (information subcarriers) and the power level of the phase reference subcarrier together with the respective decision levels can result in a wrong detected power control information. Therefore, larger and thus more secure decision levels are preferred, as explained e.g. relating to FIGS. 6 and 8.

Alternatively, the power control detection as shown in FIG. 4 can be based on comparing the magnitude of the received power control reference carrier with the mean magnitude value of the sum of the other subcarriers, since the general relationship is power=magnitude×magnitude. In this case, the calculation means 29 calculates the magnitude of the received phase reference subcarrier and the calculation means 30 calculates the mean magnitude of the sum of the magnitudes of the other received subcarriers. Then the power control detection means 31 compares the output magnitudes from the calculation means 29 and the calculation means 30 to detect and output the corresponding detected power control information.

The present invention therefore allows also an optimization of the transmission and the reception of power control information and phase reference information for various different environments and transmission properties.

What is claimed is:

1. Transmission method for transmitting signals on the basis of an orthogonal frequency division multiplex (OFDM) system, comprising the steps of:

modulating information to be transmitted in said signals onto a number of subcarriers in the frequency domain according to an OFDM modulation method, said information including phase reference information and power control information, wherein one of said subcarriers is a phase reference subcarrier that carries said phase reference information, and said power control information is modulated onto said phase reference subcarrier;

transforming said modulated signals into the time domain, and transmitting said transformed signals.

2. Transmission method according to claim 1, wherein the magnitude of said phase reference subcarrier carrying said phase reference information is modulated to represent said power control information to be transmitted.

3. Transmission method according to claim 1, wherein said phase reference subcarrier is provided with a different magnitude and thus a different power level for each of the various possible power control information to be transmitted, and a mean power value of the sum of the different possible power levels of said phase reference subcarrier is equal to a mean power value of the rest of said number of subcarriers.

4. Transmission method according to claim 3, wherein the power control information to be transmitted represents an "UP" power control information, a "DOWN" power control information or a "KEEP" power control information, and the magnitude of said phase reference subcarrier for said "KEEP" power control information is between the magnitudes of said phase reference subcarrier for said "UP" power control information and said "DOWN" power control information, respectively.

5. Transmission apparatus for transmitting signals on the basis of an orthogonal frequency division multiplex (OFDM) system comprising:

modulation means for modulating information to be transmitted in said signals onto a number of subcarriers in the frequency domain according to an OFDM modulation method, said information including phase reference information and power control information generated in a power control information generation means, wherein one of said subcarriers is a phase reference subcarrier that carries said phase reference information, and said power control information is modulated onto said phase reference subcarrier; and transformation means for transforming said modulated signals into the time domain, and transmission means for transmitting said transformed signals.

6. Transmission apparatus according to claim 5, wherein said modulation means modulates the magnitude of said phase reference subcarrier carrying said phase reference information to represent said power control information to be transmitted.

7. Transmission apparatus according to claim 5, wherein said modulation means provides said phase reference subcarrier with a different magnitude and thus a different power level for each of the various possible power control information to be transmitted, a mean power value of the sum of the different possible power levels of said phase reference subcarrier being equal to a mean power value of the rest of said number of subcarriers.

8. Transmission apparatus according to claim 5, wherein the power control information to be transmitted represents an "UP" power control information, a "DOWN" power control information or a "KEEP" power control information, and the magnitude of said phase reference subcarrier for said "KEEP" power control information is between the magnitudes of said phase reference subcarrier for said "UP" power control information and said "DOWN" power control information, respectively.

9. Receiving method for receiving signals on the basis of an orthogonal frequency division multiplex (OFDM) system, wherein information transmitted in said signals is modulated onto a number of subcarriers in the frequency domain according to an OFDM modulation method, said information including phase reference information and power control information wherein one of said subcarriers is a phase reference subcarrier that carries said phase reference information, and said power control information is modulated onto said phase reference subcarrier so that the magnitude and thus the power level of said phase reference subcarrier is modulated to represent said power control information, the modulated information signal is transformed into the time domain, and the transformed signals are transmitted, the method comprising the steps of:

receiving said transmitted signals, transforming said received signals into the frequency domain, and detecting said power level of said phase reference subcarrier to reproduce said power control information.

10. Receiving method according to claim 9, wherein said phase reference subcarrier is provided with a different magnitude and thus a different power level for each of the various possible power control information, and the respective power level of said phase reference subcarrier is detected by means of decision levels to reproduce said power control information.

11. Receiving method according to claim 10, wherein said decision levels are varied dependent on required confidence levels.

12. Receiving method according to claim 9, wherein in said step of detecting said power level, a mean power value of the sum of at least some of the rest of said number of subcarriers is calculated and compared with said detected power level of said phase reference subcarrier to provide said power control information.

13. Receiving method according to claim 12, wherein the number of subcarriers, for which said mean power value is calculated and compared with said detected power level of said phase reference subcarrier, is varied dependent on transmission properties.

14. Receiving apparatus for receiving signals on the basis of an orthogonal frequency division multiplex (OFDM) system, wherein information transmitted in said signals is modulated onto a number of subcarriers in the frequency domain according to an OFDM modulation method, said information including phase reference information and power control information and one of said subcarriers being a phase reference subcarrier for carrying said phase reference information, said power control information being modulated onto said phase reference subcarrier so that the magnitude, and thus the power level of the phase reference subcarrier is modulated to represent said power control information, the modulated information is transformed into the time domain, and the transformed signals are transmitted, the apparatus comprising:

receiving means for receiving said transmitted signals, transformation means for transforming said received signals into the frequency domain, and     detection means for detecting said power level of the phase reference subcarrier to reproduce said power control information.

15. Receiving apparatus according to claim 14, wherein said phase reference subcarrier is provided with a different magnitude and thus a different power level for each of the various possible power control information, and said detection means detects said power level of said phase reference subcarrier by means of decision levels generated by a decision level generation means to reproduce said power control information.

16. Receiving apparatus according to claim 15, wherein said decision levels are varied dependent on required confidence levels.

17. Receiving apparatus according to claim 14, wherein said detection means calculates a mean power value of the sum of at least some of the rest of said number of subcarriers and compares the calculated mean power value with said detected power level of said phase reference subcarrier to reproduce said power control information.

18. Receiving apparatus according to claim 17, wherein the number of subcarriers, for which said mean power value is calculated and compared with said detected power level of said phase reference subcarrier, is varied dependent on transmission properties.

19. A transmission system for transmitting orthogonal frequency division multiplex (OFDM) signals, comprising:

transmission apparatus, including modulation means for modulating information to be transmitted in said signals onto a number of subcarriers in the frequency domain according to an OFDM modulation method, said information including phase reference information and power control information generated in a power control information generation means, wherein one of said subcarriers is a phase reference subcarrier that carries said phase reference information, and said power control information is modulated onto said phase reference subcarrier;

first transformation means for transforming said modulated signals into the time domain, and         transmission means for transmitting said transformed signals; and     receiving apparatus, including         receiving means for receiving said transformed signals,         second transforming means for transforming said received signals into the frequency domain, and         detection means for detecting the power level of said phase reference subcarrier to reproduce said power control information.

* * * * *